(12) United States Patent
Wang

(10) Patent No.: US 8,129,994 B2
(45) Date of Patent: Mar. 6, 2012

(54) MICRORESISTIVITY IMAGING IN CONDUCTIVE AND NONCONDUCTIVE DRILLING FLUID

(75) Inventor: Tsili Wang, Katy, TX (US)

(73) Assignee: Smith International Inc, Houston, TX (US)

( * ) Notice: Subject to any disclaimer, the term of this patent is extended or adjusted under 35 U.S.C. 154(b) by 358 days.

(21) Appl. No.: 12/581,245

(22) Filed: Oct. 19, 2009

(65) Prior Publication Data

US 2011/0089951 A1    Apr. 21, 2011

(51) Int. Cl.
*G01V 3/00* (2006.01)
(52) U.S. Cl. .................. 324/369; 324/347; 324/366
(58) Field of Classification Search .................. None
See application file for complete search history.

(56) References Cited

U.S. PATENT DOCUMENTS

| | | | |
|---|---|---|---|
| 4,594,552 A | 6/1986 | Grimaldi et al. | |
| 5,235,285 A | 8/1993 | Clark et al. | |
| 5,339,037 A | 8/1994 | Bonner et al. | |
| 6,173,793 B1 | 1/2001 | Thompson et al. | |
| 6,191,588 B1 | 2/2001 | Chen | |
| 6,359,438 B1 | 3/2002 | Bittar | |
| 6,373,254 B1 | 4/2002 | Dion et al. | |
| 6,396,276 B1 | 5/2002 | Van Steenwyk et al. | |
| 6,600,321 B2 | 7/2003 | Evans | |
| 6,714,014 B2 | 3/2004 | Evans et al. | |
| 6,891,377 B2 | 5/2005 | Cheung et al. | |
| 7,046,010 B2 | 5/2006 | Hu et al. | |
| 7,066,282 B2 | 6/2006 | Chen et al. | |
| 7,073,609 B2 | 7/2006 | Tabanou et al. | |
| 7,098,664 B2 | 8/2006 | Bittar et al. | |
| 7,242,194 B2 | 7/2007 | Hayman et al. | |
| 7,250,768 B2 | 7/2007 | Ritter et al. | |
| 7,265,553 B2 | 9/2007 | Cheung et al. | |
| 7,284,605 B2 | 10/2007 | Clark et al. | |
| 2004/0245991 A1 | 12/2004 | Hayman et al. | |
| 2006/0267591 A1 | 11/2006 | Hayman | |
| 2010/0007349 A1* | 1/2010 | Gorek et al. .................. | 324/373 |

OTHER PUBLICATIONS

International Search Report and Written Opinion dated Mar. 24, 2011 for corresponding PCT application No. PCT/US2010/053135 filed Oct. 19, 2010.

* cited by examiner

*Primary Examiner* — Minh N Tang
(74) *Attorney, Agent, or Firm* — Matthew Steinheider; Darla P. Fonseca; Brigitte Echols (57) ABSTRACT

A microresistivity logging tool includes a shield electrode deployed between a guard electrode and a return electrode. A measuring electrode is deployed in and electrically isolated from the guard electrode and first and second potential electrodes are deployed in and electrically isolated from the shield electrode. The tool further includes at least one switch configured to switch the tool between distinct first and second microresistivity measurement modes. The first measurement mode is configured for making microresistivity measurements in conductive (water based) drilling fluid and the second measurement mode is configured for making microresistivity measurements in non-conductive (oil based) drilling fluid, thereby enabling the tool to be utilized in either type of drilling fluid.

22 Claims, 6 Drawing Sheets

MICRORESISTIVITY IMAGING IN CONDUCTIVE AND NONCONDUCTIVE DRILLING FLUID

RELATED APPLICATIONS

None.

FIELD OF THE INVENTION

The present invention relates generally to microresistivity logging measurements. More particularly, embodiments of the invention relate to a logging while drilling tool suitable for making microresistivity measurements in both conductive and non-conductive drilling fluids.

BACKGROUND OF THE INVENTION

The use of electrical measurements in prior art downhole applications, such as logging while drilling (LWD) and wireline logging applications, is well known. Such techniques may be utilized, for example, to determine a subterranean formation resistivity, which, along with formation porosity measurements, may be used to indicate the presence of hydrocarbons in the formation. It is known in the art that porous formations having a high electrical resistivity often contain hydrocarbons, such as crude oil, while porous formations having a low electrical resistivity are often water saturated. It will be appreciated that the terms resistivity and conductivity are often used interchangeably in the art. Those of ordinary skill in the art will readily recognize that these quantities are reciprocals and that one may be converted to the other via simple mathematical calculations. Mention of one or the other herein is for convenience of description, and is not intended in a limiting sense.

Techniques for making microresistivity measurements of a subterranean formation are well known in the prior art for both wireline and LWD operations. Microresistivity logging tools commonly make use of one of two known measurement principles depending upon whether conductive (water based) or non-conductive (oil based) drilling fluid (mud) is being used. When conductive drilling fluid is utilized, the borehole annulus provides a good conduit for electrical current. One of the primary challenges is to focus the electrical current so that it enters the formation. The use of non-conductive drilling fluid poses different challenges. An oil based drilling fluid can severely impede the flow of electrical current through the fluid into the formation. One significant challenge is in causing the electrical current to penetrate the drilling fluid so that it enters the formation.

Microresistivity sensors configured for use with conductive drilling fluid commonly include at least three electrodes: a guard electrode, a return electrode, and a measuring electrode which is commonly deployed in and electrically isolated from the guard electrode. The primary purpose of the guard electrode is to focus electrical current into the formation. In use, an AC voltage is applied between the guard electrode and the return electrode, which results in an alternating current being passed through the formation between these electrodes. The measuring electrode is commonly held at the same potential as the guard electrode so that current is also passed between the measuring electrode and the return electrode. This current in the measuring electrode is monitored and tends to be approximately inversely proportional to the resistivity of the formation opposing the measuring electrode.

Microresistivity sensors configured for use with non-conductive drilling fluid are known to include at least four electrodes: including a pair of spaced potential electrodes deployed between current injector and return electrodes. In use, a high frequency alternating current (e.g., on the order of 1 megahertz) is passed between the injector and return electrodes. A high frequency is typically required so as to reduce the electrical impedance of the oil based drilling fluid and enable a portion of the current to penetrate the formation. The use of high frequencies is also known to cause displacement currents in the sensor and in the non-conductive drilling fluid. In the absence of these displacement currents (or when the displacement currents have been accounted for), the voltage drop between the potential electrodes tends to be approximately proportional to the resistivity of the formation.

Those of skill in the art will understand that oil based drilling fluid is commonly utilized when drilling through water soluble formations (e.g., including salt layers). The use of oil based (non-conductive) drilling fluid is known to greatly reduce the effectiveness of microresistivity logging tools configured for use with water based (conductive) drilling fluid. Likewise, it is generally known in the art that microresistivity logging tools configured for use with oil based drilling fluid (e.g., as described in the preceding paragraph) are not well suited for making microresistivity measurements in conductive drilling fluid. The conventional wisdom in the art is that discrete sensors (or even discrete logging tools) are required. As such there has been a need in the art to provide a suite of microresistivity logging tools; some of which are configured for use in conductive drilling fluid and others of which are configured for use in non-conductive drilling fluid. The need to provide additional tools and associated maintenance support tends to be cost intensive for downhole tool suppliers. Therefore, there exists a need in the art for a microresistivity logging tool (and a sensor) that is suitable for making microresistivity measurements in both conductive and non-conductive drilling fluids.

SUMMARY OF THE INVENTION

Aspects of the present invention are intended to address the above described need for improved microresistivity logging sensors. In one exemplary embodiment, the invention includes a logging tool having a microresistivity sensor configured for use in both conductive and non-conductive drilling fluid. In one exemplary embodiment, the invention includes a logging tool having a shield electrode deployed between a guard electrode and a return electrode. A measuring electrode is deployed in and electrically isolated from the guard electrode and first and second potential electrodes are deployed in and electrically isolated from the shield electrode. The sensor further includes at least one switch (or switching mechanism) configured to switch the sensor between distinct first and second microresistivity measurement modes. The first measurement mode is configured for making microresistivity measurements in conductive drilling fluid and the second measurement mode is configured for making microresistivity measurements in non-conductive drilling fluid.

Exemplary embodiments of the present invention may advantageously provide several technical advantages. For example, logging tools in accordance with the present invention may be advantageously utilized in either conductive or non-conductive drilling fluid. This feature of the invention enables a downhole tool supplier to simplify their suite of logging tools by providing a single microresistivity logging tool and therefore tends to reduce costs.

The present invention also enables dual mode measurements to be made. Such dual mode measurements may be advantageous, for example, in drilling operations utilizing moderately conductive drilling fluid (e.g., fresh water based). The dual-mode measurement provides additional information to enhance data quality and/or to cross validate the single mode measurements as a means of quality control.

Certain advantageous embodiments of the invention may further include a drilling fluid conductivity sensor and may be further configured to automatically select a microresistivity measurement mode based on the measured conductivity of the drilling fluid.

In one aspect the present invention includes a logging while drilling microresistivity tool. The tool includes guard, measuring, return, shield, and first and second potential electrodes deployed on a tool body. The guard electrode is configured to inject electrical current into a formation. The measuring electrode is deployed in and electrically isolated from the guard electrode. The return electrode is spaced apart from the guard electrode and provides a return path for the electrical current. The shield electrode is interposed between the guard electrode and the return electrode and the first and second potential electrodes are deployed in the shield electrode. A controller includes a switch configured to switch the tool between first and second microresistivity measurement modes. The switch includes first and second positions, the first position corresponding to the first measurement mode and the second position corresponding to the second measurement mode.

In another aspect, the present invention includes a method for microresistivity logging while drilling. The method includes providing the above described microresistivity logging tool and causing the switch to be in the first position. The tool is deployed in a subterranean borehole that is at least partially filled with an electrically conductive drilling fluid. An AC voltage is applied between the guard and return electrodes and an alternating current is measured in the measuring electrode. A quantity that is at least partially related to the formation resistivity is computed from the measured current.

In yet another aspect, the present invention includes a method for microresistivity logging while drilling. The method includes providing the above described microresistivity logging tool and causing the switch to be in the second position. The tool is deployed in a subterranean borehole that is at least partially filled with an electrically conductive drilling fluid. An alternating current is applied between the guard and return electrodes and a potential difference is measured between the first and second potential electrodes. A quantity that is at least partially related to the formation resistivity is computed from the measured potential difference.

In still another aspect, the present invention includes a method for microresistivity logging while drilling. The method includes deploying the above described microresistivity logging tool in a borehole. The switch is caused to be in the first position. An AC voltage is applied between the guard and return electrodes and an alternating current is measured in the measuring electrode. The switch is caused to be in the second position. An alternating current is applied between the guard and return electrodes and a potential difference measured between the first and second potential electrodes. First and second quantities that are at least partially related to the formation resistivity are computed from the measured current and the measured potential difference. The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Referring now to FIGS. 1 through 10, exemplary embodiments of the present invention are depicted. With respect to FIGS. 1 through 10, it will be understood that features or aspects of the embodiments illustrated may be shown from various views. Where such features or aspects are common to particular views, they are labeled using the same reference numeral. Thus, a feature or aspect labeled with a particular reference numeral on one view in FIGS. 1 through 10 may be described herein with respect to that reference numeral shown on other views.

Figure 1:
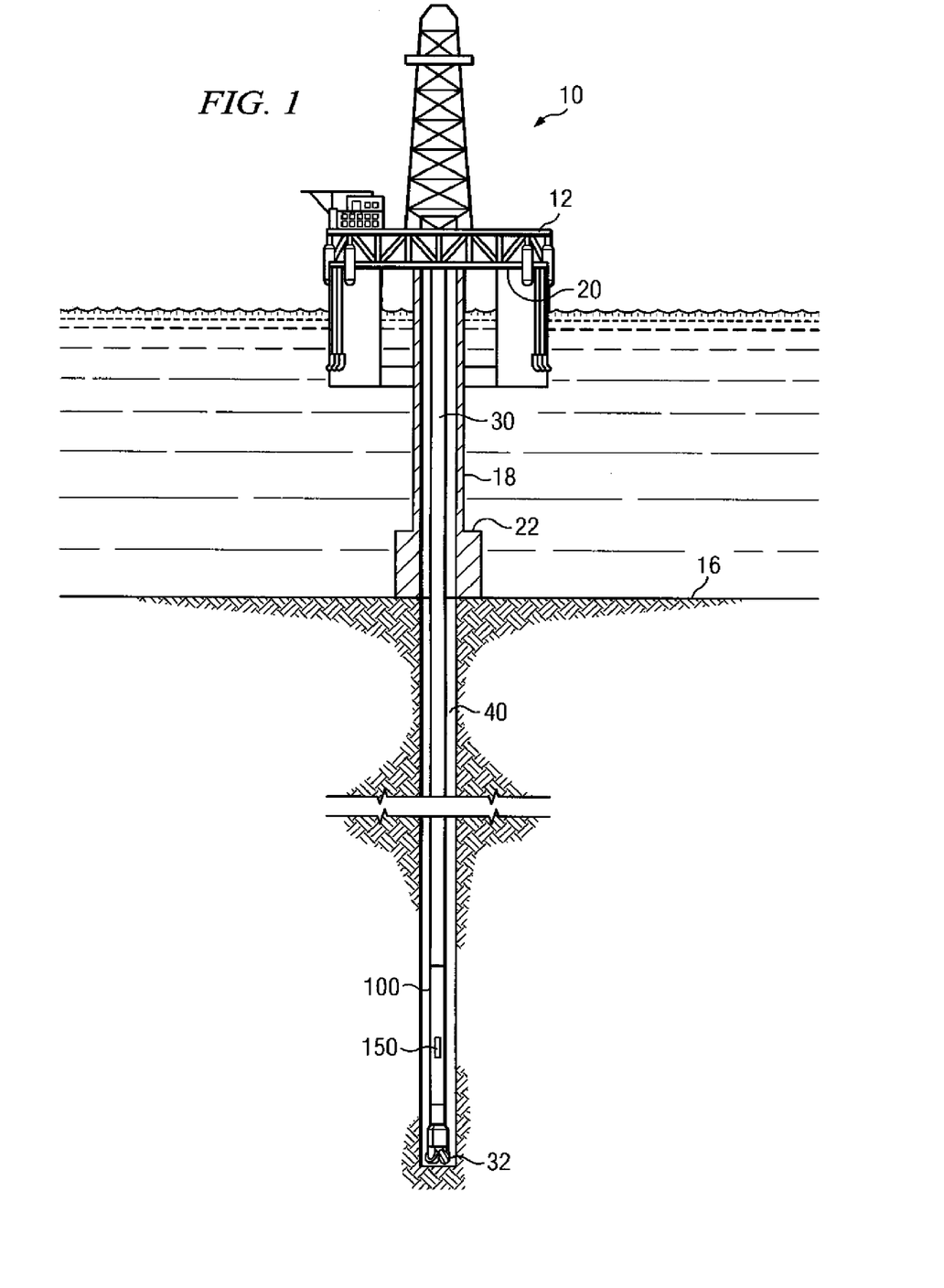
FIG. 1 depicts a conventional drilling rig on which exemplary embodiments of the present invention may be utilized.
Figure 2:
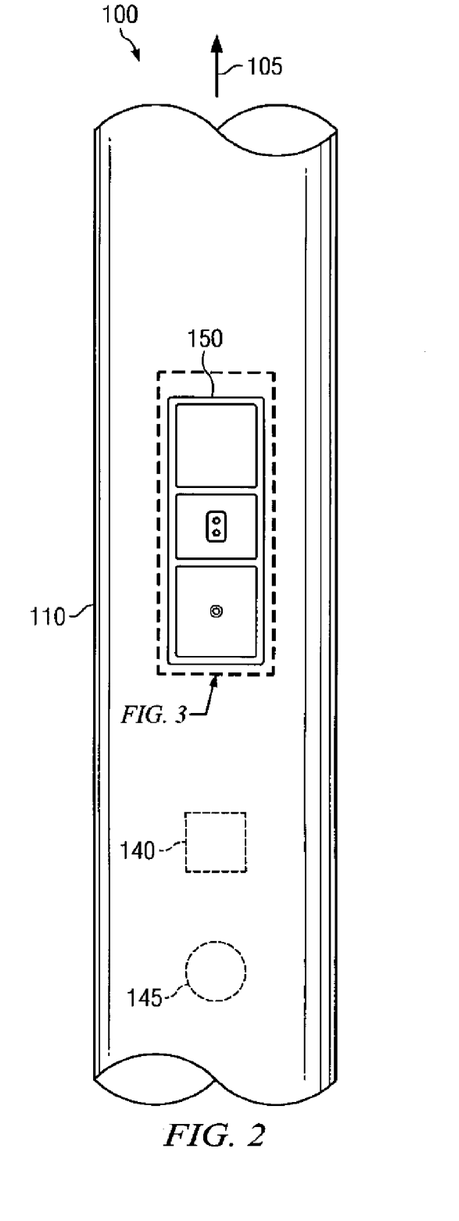
FIG. 2 depicts one exemplary embodiment of a microresistivity tool in accordance with the present invention.

FIG. 1 depicts one exemplary embodiment of a microresistivity logging while drilling tool 100 in use in an offshore oil or gas drilling assembly, generally denoted 10. In FIG. 2, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes a drill bit 32 and logging while drilling tool 100. Embodiments of LWD tool 100 include at least one microresistivity sensor 150. Drill string 30 may further include, for example, a downhole drill motor, a mud pulse telemetry system, a steering tool, and/or one or more of numerous other MWD and LWD sensors for sensing downhole characteristics of the borehole and the surrounding formation.

It will be understood by those of ordinary skill in the art that the deployment depicted on FIG. 1 is merely exemplary for purposes of describing the invention set forth herein. It will be further understood that logging tools in accordance with the present invention are not limited to use with a semisubmersible platform 12 as illustrated on FIG. 1. Measurement tool 100 is equally well suited for use with any kind of subterranean drilling operation, either offshore or onshore. While measurement tool 100 is shown coupled with drill string 30 on FIG. 1, it will also be understood that the invention is not limited to LWD embodiments, but may also be utilized in wireline microresistivity tools.

FIG. 2 depicts a portion of one exemplary embodiment of LWD tool 100. As described above with respect to FIG. 1, LWD tool 100 includes a microresistivity sensor 150 deployed on an LWD tool body 110. While not depicted on FIG. 2, it will be understood that sensor 150 may be deployed, for example, in a stabilizer blade, a rotary steerable blade, an enlarged diameter sleeve, or any other device so as to reduce the standoff distance between the sensor 150 and the borehole wall. It will also be understood that while not shown, such tool configurations may be advantageous in certain applications. In the exemplary embodiment depicted, a long axis of the microresistivity sensor is substantially parallel with a longitudinal axis 105 of the tool 100. While this configuration is generally preferred for achieving optimum azimuthal coverage, the invention is expressly not limited in these regards.

LWD tool 100 may optionally further include an azimuth sensor 140 configured to measure the azimuth angle (toolface angle) of the microresistivity sensor 150 in substantially real time during drilling. Suitable azimuth sensors typically include one or more accelerometers, magnetometers, and/or gyroscopes and are well known in the art. It will be understood that the invention is not limited to any particular azimuth sensor configuration or even to the use of an azimuth sensor.

LWD tool 100 may further optionally include a conductivity sensor 145 configured to measure an electrical conductivity (or resistivity) of the drilling fluid (e.g., while drilling). The invention is not limited to any particular conductivity sensor as suitable conductivity sensors are known in the art.

Figure 3:
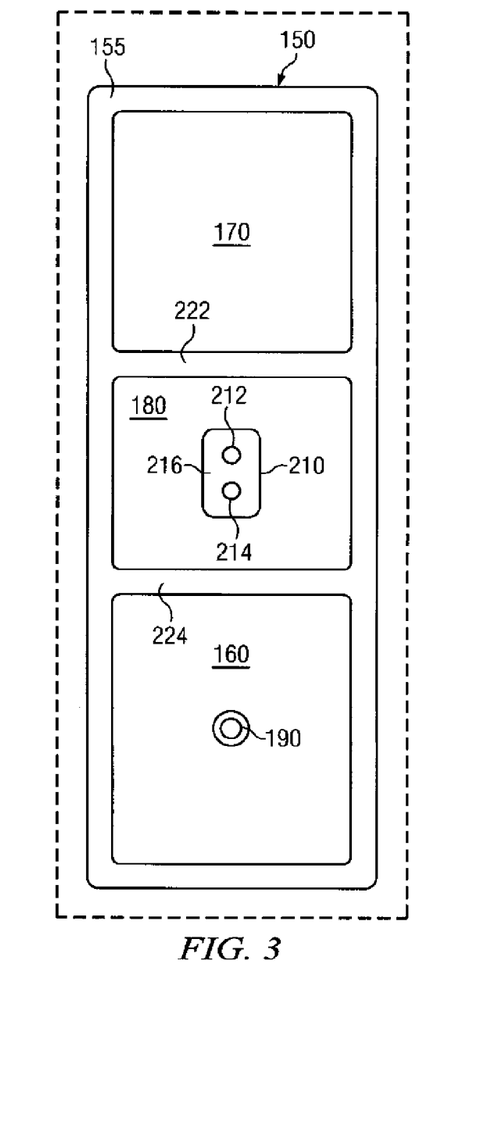
FIG. 3 depicts an exemplary microresistivity sensor in accordance with the present invention.

FIG. 3 depicts one exemplary embodiment of a microresistivity sensor 150 in accordance with the present invention. As described in more detail below with respect to FIG. 4, sensor 150 may be used in either conductive or non-conductive drilling fluid. Sensor 150 includes at least one measuring electrode 190 deployed in and electrically insulated from a guard electrode 160. A spaced apart return electrode 170 provides a return path for electrical current injected by the measuring and guard electrodes. Sensor 150 further includes at least one shield electrode 180 interposed between the guard 160 and return 170 electrodes. At least one electrical potential sensor 210 is deployed in the shield electrode 180. Sensor 210 includes at least first and second potential electrodes 212 and 214 deployed in and electrically isolated from the shield electrode 180 (e.g., in electrically insulative material 216). Electrodes 160, 170, and 180 are electrically isolated from one another via a conventional electrically insulating material 155. In the exemplary embodiment, depicted sensor 150 includes an insulative gap 222 between the return 170 and the shield 180 electrodes and an insulative gap 224 between the shield 180 and the guard 160 electrodes.

It will be understood by those of ordinary skill in the art that the invention is not limited to the particular sensor configuration depicted on FIG. 3. For example, the electrodes depicted on FIG. 3 may alternatively be circumferentially or obliquely spaced on the tool body 110. The invention is expressly not limited in regards to the spacing, shape, and/or size of the electrodes.

Figure 4:
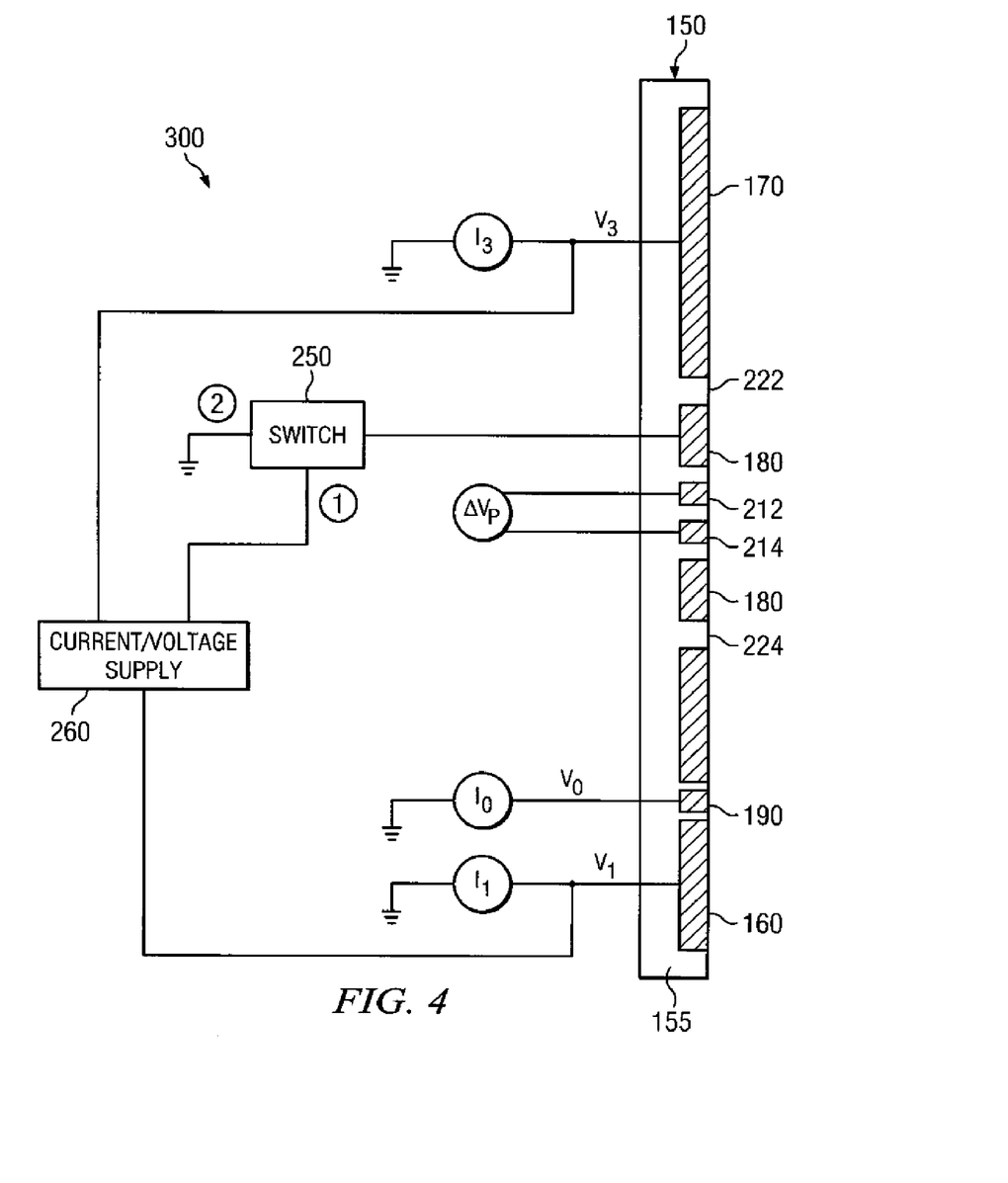
FIG. 4 depicts a longitudinal cross section of the sensor depicted on FIG. 3.

FIG. 4 depicts a longitudinal cross section of the sensor embodiment 150 depicted on FIG. 3. As depicted, sensor 150 further includes at least one switch 250 (or switching mechanism) configured to switch the sensor 150 between distinct first and second microresistivity measurement modes. The first measurement mode is configured for making microresistivity measurements in conductive drilling fluid and the second measurement mode is configured for making microresistivity measurements in non-conductive drilling fluid. The invention may include substantially any suitable switching mechanism, for example, including a conventional hardwired dip-switch having first and second positions corresponding to the first and second drilling modes. The switching mechanism may also be automatic, for example, including a software or firmware based mechanism having first and second positions (or settings) corresponding to the first and second drilling modes.

Microresistivity tool 100 typically further includes a controller 300 configured to control the functionality of the tool in each of the first and second measurement modes. The controller typically includes a current/voltage supply 260 configured to apply a predetermined voltage or current between the guard electrode 160 and the return electrode 170. In the first measurement mode, the controller may be configured to apply a predetermined AC voltage between the guard 160 and return 170 electrodes. The applied voltage typically causes an alternating current to be injected into the subterranean formation. In order to achieve optimal focusing, the voltages at the guard 160 and measuring 190 electrodes are typically held equal to one another (i.e., $V_0 = V_1$). Methods for achieving such voltage control during microresistivity LWD operations are known in the art and are therefore discussed no further herein. In this first measurement mode, the controller may be further configured to measure the electrical current $I_0$ in the measuring electrode (e.g., via a conventional low impedance ammeter) and compute a resistivity value from the measured current.

In the second measurement mode (when the switch 250 is in the second position), the controller may be configured to apply a predetermined alternating current between the guard 160 and return 170 electrodes. The controller may be further configured to measure an AC potential difference (voltage drop) $\Delta V_p$ between the first and second potential electrodes (e.g., via a conventional high impedance voltmeter) and to compute a resistivity value from the measured potential difference. The controller is preferably configured to apply a comparatively low frequency AC voltage between the guard 160 and return 170 electrodes in the first measurement mode (e.g., in the range from about 0.1 to about 10 kHz) and a comparatively high frequency alternating current between the guard 160 and return 170 electrodes in the second measurement mode (e.g., in the range from about 0.1 to about 10 MHz). Those of ordinary skill in the art will appreciate that substantially any suitable AC waveform (e.g., square wave or sinusoidal) may be utilized.

Microresistivity Measurements in Water Based Mud

In the exemplary embodiment depicted on FIG. 4, the switch 250 is electrically connected to the shield electrode 180. When the switch 250 is in a first position (corresponding with the first measurement mode), it electrically connects the shield electrode 180 to the current/voltage supply 260. The current/voltage supply 260 may further electrically connect the shield electrode 180 to the guard electrode 160, thereby setting the electrical potential of the shield electrode equal to that of the guard electrode 160. In such embodiments, the shield electrode 180 functions (along with the guard electrode) as a current injector. Alternatively, the current/voltage supply 260 may electrically connect the shield electrode 180 to the return electrode 170, thereby setting the electrical potential of the shield electrode 180 to that of the return electrode 170. In such embodiments, the shield electrode 180 functions (along with the return electrode) as a current return.

Figure 5:
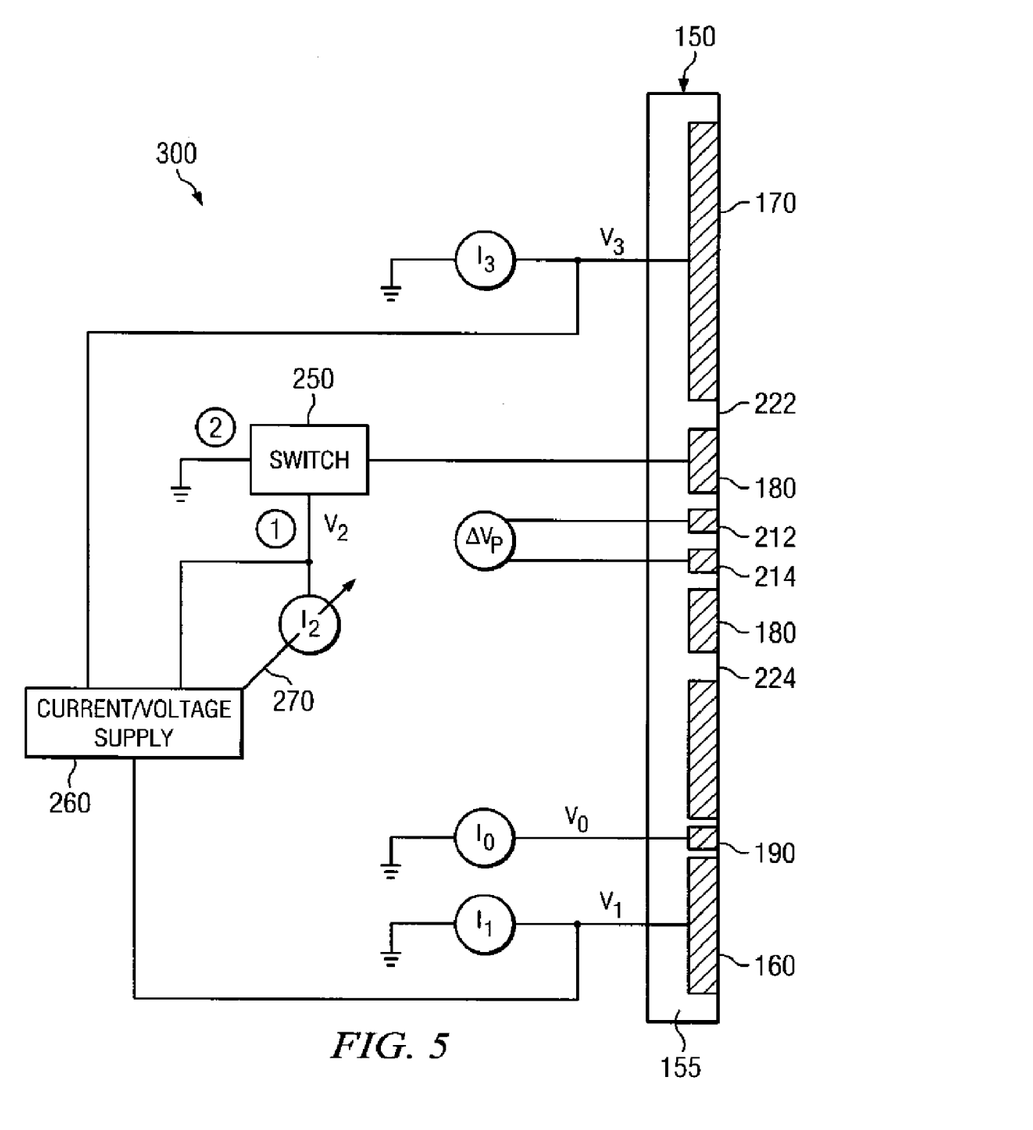
FIG. 5 depicts an alternative microresistivity sensor embodiment in accordance with the present invention.

With reference now to FIG. 5, the current/voltage supply 260 may further include a drive circuit (not shown) that is configured to control the electrical potential of the shield electrode 180 with respect to the guard 160 and return 170 electrodes. In the exemplary embodiment depicted, the drive circuit includes a variable AC current supply 270 configured to control the current $I_2$ in the shield electrode 180 so as to select the voltage $V_2$ thereof. In one preferred embodiment, the drive circuit may be configured to set the electrical potential (voltage) of the shield electrode 180 to substantially any potential between the electrical potentials (voltages) of the guard 160 and return 170 electrodes such that: $V_1 \leq V_2 \leq V_3$. While electrical potentials in the range from $V_1$ to $V_3$ are generally preferred, the drive circuit may also be configured to set the potential of the shield electrode to values outside of the range. The drive circuit may be configured to set $V_2$ to discrete preselected values or to dynamically adjust the potential of the shield electrode 180. The invention is not limited in any of these regards.

While not depicted on FIG. 4 or 5, it will be understood that when the switch (or switching mechanism) is in the first position it may also optionally be configured to disconnected (either physically or electrically) the voltmeter from the potential electrodes 212 and 214 and to connect these electrodes 212 and 214 to the shield electrode 180. In another optional configuration, the potential electrodes 212 and 214 may be disconnected from the voltmeter, but remain electrically floating.

Figure 6:
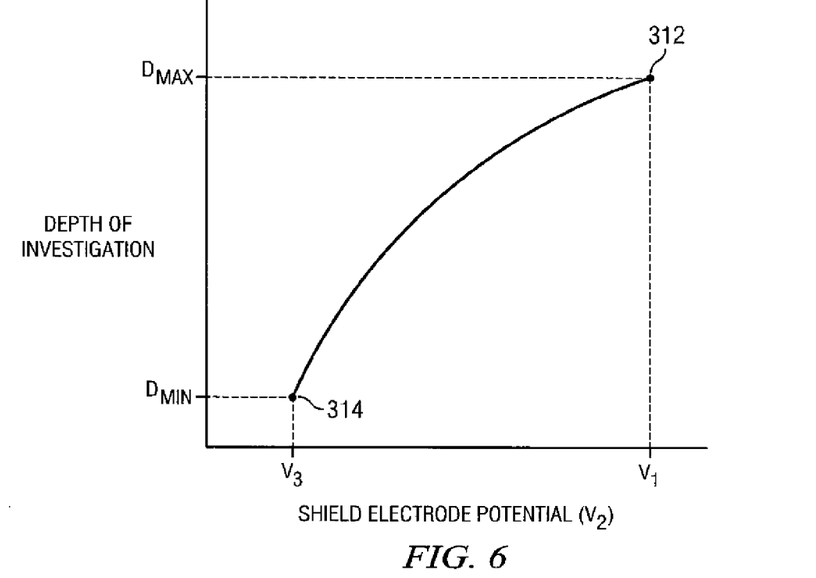
FIG. 6 depicts a plot of depth of investigation versus electrode potential for the exemplary sensor embodiment depicted on FIG. 5.

With further reference now to FIG. 6, it will be appreciated that the exemplary sensor embodiments depicted on FIGS. 4 and 5, advantageously enable microresistivity measurements to be made at selected depths of investigation when deployed in conductive drilling fluid. For example, when the shield electrode 180 is electrically connected to the guard electrode 160 the measured depth is greater (as depicted at 312 on FIG. 6) than when the shield electrode 180 is electrically connected to the return electrode (314 on FIG. 6). The tool configuration depicted on FIG. 5 is particularly advantageous in that it enables substantially any depth of investigation with a predetermined range to be selected. This may be accomplished by selecting the value of the voltage $V_2$ (e.g., relative to voltages $V_1$ and $V_3$). FIG. 6 depicts a plot of the depth of investigation as a function of the voltage $V_2$ of the shield electrode 180. As depicted, the depth of investigation is a minimum when the voltage $V_2$ of the shield electrode 180 is about equal to the voltage $V_3$ of the return electrode 170. The depth of investigation tends to increase monotonically with increasing voltage to a maximum when the voltage $V_2$ of the shield electrode 180 is about equal to the voltage $V_1$ of the guard electrode 160.

Measurements at multiple depths of investigation may be made simultaneously using the exemplary embodiment of the invention depicted on FIG. 5. For example, an AC current may be injected into a subterranean formation simultaneously at first and second frequencies F1 and F2 at the guard electrode. Frequencies F1 and F2 may advantageously be in the range, for example, from about 0.1 to about 10 kHz. Meanwhile, the voltage $V_2$ of the shield electrode 180 may be set to a first low potential at the first frequency F1 (e.g., such that $V_2=V_3$) and to a second high potential at the second frequency F2 (e.g., such that $V_2=V_1$). The injection currents $I_0$ may then be measured (preferably simultaneously) at each of these first and second frequencies. Those of ordinary skill in the art will appreciate that there is typically little or no interference between these injection currents since they are at distinct frequencies. The measured currents may then be utilized to calculate first and second resistivity values corresponding to first and second depths of investigation. It will be understood (in light of FIG. 6) that in this example the measurement made at the first frequency has a shallower depth of investigation than the corresponding measurement made at the second frequency. It will further be understood that the invention is not limited to making measurements at only one or two distinct frequencies. Substantially any number of suitable frequencies (e.g., 3, 4, or more) may be utilized enabling simultaneous resistivity measurements to be made at a plurality of depths of investigation.

As described above, exemplary embodiments in accordance with the present invention advantageously enable microresistivity measurements to be made at multiple depths of investigation using only a single measuring electrode (e.g., electrode 190 in FIGS. 4-6). It will be understood, however, that the invention is not limited to sensor embodiments having a single measuring electrode 190. Sensor embodiments in accordance with the present invention may include substantially any suitable number of measuring electrodes deployed in the guard 160 and/or return 170 electrodes. Nor is the invention limited to any particular measuring electrode deployment location or spacing in the guard and/or return electrodes.

Figure 7:
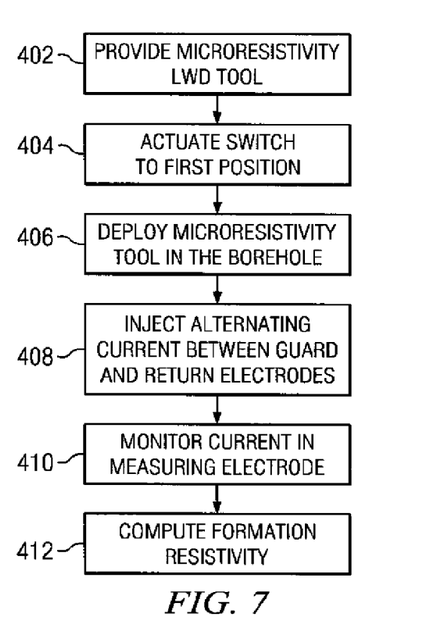
FIG. 7 depicts a flow chart of one exemplary method embodiment in accordance with the present invention.

Turning now to FIG. 7, one exemplary method embodiment in accordance with the present invention is depicted in flow chart form. In this particular embodiment, a microresistivity tool in accordance with the present invention (e.g., as depicted on FIGS. 3 and 4) is provided at 402. The switch 250 is set to the first position at 404, thereby configuring the tool for making microresistivity measurements in electrically conductive drilling fluid. The tool may then be deployed in the borehole and optionally rotated with the drill string during drilling at 406. A predetermined AC voltage is applied between the guard 160 and return 170 electrodes which causes an alternating current to be injected into the formation at 408. The electrical current in the measuring electrode is monitored at 410 and is used to compute a quantity at least partially related to the formation resistivity at 412.

Microresistivity Measurements in Oil Based Mud

With reference again to the exemplary embodiment of the invention depicted on FIG. 4, the switch 250 grounds the shield electrode 180 (electrically connects it to the tool body 110) when it is in the second position. As described above, a high frequency alternating current (e.g., about 1 MHz) is typically applied between the guard 160 and return 170 electrodes in the second measurement mode (for oil based drilling fluids). At these high frequencies, the insulative material 155 in the sensor and the non-conductive drilling fluid function as dielectrics and therefore provide electrical conduits for displacement currents in the tool and borehole annulus (those of skill in the art will appreciate that the electrical impedance of these dielectrics decreases with increasing frequency). The resulting displacement currents can produce a measureable electric field (potential difference) between the first and second potential electrodes 212 and 214 even when the measurements are made in air. Such a potential difference is spurious in the sense that it contains no information about the formation resistivity. The use of a grounded, electrically conductive shield electrode 180 (e.g., as depicted on FIG. 4) advantageously removes the spurious electric field caused by displacement currents in the sensor and in the drilling fluid since induced displacement currents in the sensor and drilling fluid will tend to propagate through the shield electrode (which has near zero impedance).

Insulative gaps 222 and 224 are provided between the return 170 and shield 180 electrodes and between the shield 180 and guard 160 electrodes to prevent the shield electrode from shorting out the guard 160 and return 170 electrodes. These gaps 222 and 224 preferably have an electrical impedance that is greater than the electrical impedance of the drilling fluid between the electrodes and the formation to ensure sufficient penetration of electrical current into the formation. This may be accomplished, for example, by configuring the sensor 150 such that the gaps 222 and 224 have a width that is greater than the anticipated standoff distance between the electrodes and the borehole wall. It will therefore be understood that gaps 222 and 224 may be thinner in embodiments in which the sensor 150 is deployed on a blade or enlarged sleeve.

Figure 8:
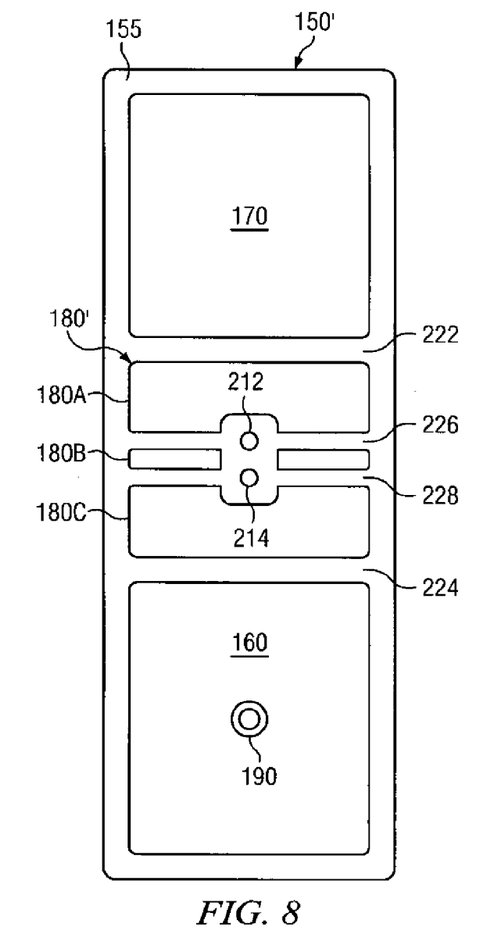
FIG. 8 depicts an alternative sensor embodiment in accordance with the present invention.

Turning now to FIG. 8, one alternative sensor embodiment 150' in accordance with the present invention is depicted. Sensor 150' is similar to sensor 150 in that it includes spaced guard 160 and return 170 electrodes. Sensor 150' also includes a measuring electrode 190 and first and second potential electrodes 212 and 214 as described above with respect to FIG. 3. Sensor 150' differs from sensor 150 in that the shield electrode 180' includes first, second, and third longitudinally spaced elements 180A, 180B, and 180C. These elements are separated by insulative gaps 226 and 228. Sensor 150' may be advantageous in certain applications in that it includes additional insulative gaps 226 and 228 between the guard 160 and return 170 electrodes. These gaps may enable the width of gaps 222 and 224 to be reduced, thereby mechanically strengthening the sensor 150'.

Elements 180A, 180B, and 180C may be electrically connected to one another such that the shield electrode 180' has an equi-potential surface (as does shield electrode 180). However, the invention is not limited in this regard. For example, element 180B may be grounded when the switch 250 is in the second position while elements 180A and 180C may remain electrically floating. When the switch 250 is in the first position, elements 180A, 180B, and 180C may be independently connected to either the guard or return electrodes. For example, element 180A may be electrically connected to the return electrode 170 and elements 180B and 180C to the guard electrode 160. The invention is not limited in any of these regards.

Figure 9:
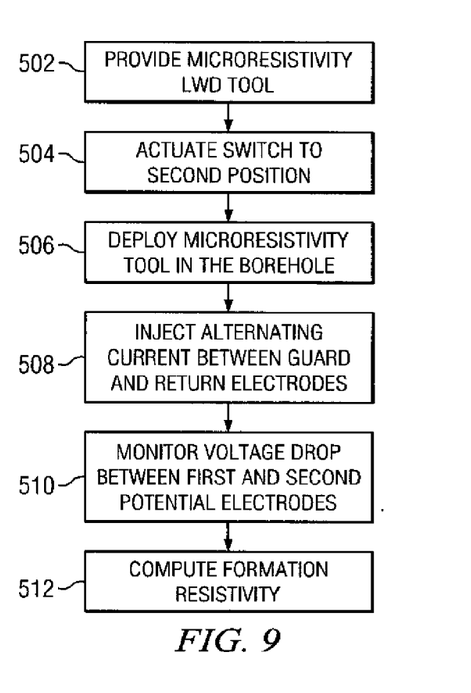
FIG. 9 depicts a flow chart of another exemplary method embodiment in accordance with the present invention.

Turning now to FIG. 9, a flow chart of another exemplary method embodiment in accordance with the present invention is depicted in flow chart form. In this particular embodiment, a microresistivity tool in accordance with the present invention (e.g., as depicted on FIGS. 3 and 4) is provided at 502. The switch 250 is set to the second position at 504, thereby configuring the tool for making microresistivity measurements in electrically non-conductive drilling fluid. The tool may then be deployed in the borehole and optionally rotated with the drill string during drilling at 506. A predetermined alternating current is passed between the guard and return electrodes at 508, at least a portion of which is injected into the formation. The potential drop (i.e., the voltage difference) between the first and second potential electrodes is monitored at 510 and is used to compute a quantity at least partially related to the formation resistivity at 512.

While the invention is described above with respect to a sensor embodiment having a single pair of potential electrodes, it will be understood that the invention is not limited in this regard. Multiple pairs of potential electrodes may be utilized, for example, located side by side in the shield electrode.

Dual-Mode Microresistivity Measurements

Figure 10:
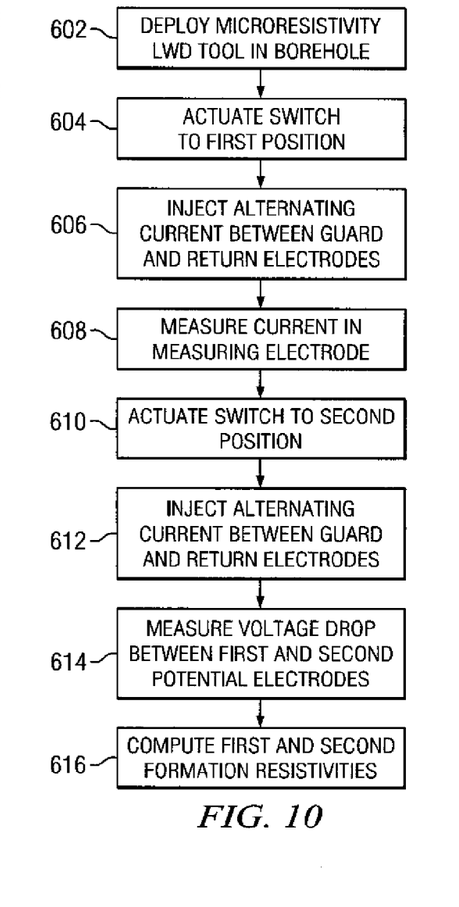
FIG. 10 depicts a flow chart of still another exemplary method embodiment in accordance with the present invention.

Turning now to FIG. 10, a flow chart of another exemplary method embodiment in accordance with the present invention is depicted. In this particular embodiment, a microresistivity tool in accordance with the present invention (e.g., as depicted on FIGS. 3 and 4) is deployed in a subterranean borehole at 602. The switch 250 is moved to the first position at 604, thereby configuring the tool for making microresistivity measurements using the first measurement mode. A predetermined AC voltage is applied between the guard 160 and return 170 electrodes which causes an alternating current to be injected into the formation at 606. The electrical current in the measuring electrode is monitored at 608. The switch 250 is then moved to the second position at 610, thereby configuring the tool for making microresistivity measurements using the second measurement mode. A predetermined alternating current is passed between the guard and return electrodes at 612, at least a portion of which is injected into the formation. The potential drop (i.e., the voltage difference) between the first and second potential electrodes is monitored at 614. At 616 the current measured at 608 and the potential drop measured at 614 are used to compute first and second quantities at least partially related to the formation resistivity.

The method depicted on FIG. 10 makes sequential microresistivity measurements using the first and second measurement modes. Such a methodology may be advantageous in certain drilling operations, for example, when using moderately conductive drilling fluid (e.g., fresh water based). These "dual-mode" measurements provide additional information that may enhance data quality and/or to cross-validate the single mode measurements as a means of quality control.

Automatic Measurement Mode Selection

Logging tools in accordance with the present invention may be configured to automatically select the appropriate measurement mode. In such embodiments, the controller 300 (FIG. 4) controls actuation of the switch (or switching mechanism). For example, the controller may be configured to select the first or second switch positions (i.e., the first or the second measurement modes) based upon the conductivity of the drilling fluid. In such an embodiment, the controller may be configured to select the first switch position (the first measurement mode) when the conductivity is greater than a predetermined threshold and the second switch position (the second measurement mode) when the conductivity is less than the threshold. Alternatively, the controller may be configured to select (i) the first measurement mode when the drilling fluid conductivity is greater than a first predetermined threshold, (ii) the second measurement mode when the drilling fluid conductivity is less than a second predetermined threshold, and (iii) a dual-mode configuration when the drilling fluid conductivity is between the first and second thresholds.

The conductivity of the drilling fluid may be acquired by the controller, for example, via operator input or from a conductivity sensor 145. Since the conductivity of the drilling fluid can change during drilling (e.g. due to temperature changes or due to salt or gas influx into the borehole), the use of a conductivity sensor may advantageously enable the measurement mode to be selected based upon actual borehole conditions. However, the invention is not limited in this regard.

With reference again to FIGS. 2 through 4, measurement tool 100 commonly includes an additional controller or a controller 300 with additional functionality. A suitable controller typically includes a programmable processor (not shown), such as a microprocessor or a microcontroller, and may also include processor-readable or computer-readable program code embodying logic, including instructions for controlling the function of the tool. A suitable controller may be utilized, for example, to make microresistivity measurements while drilling. As such the controller may further be configured to: (i) inject an alternating electrical current into a formation at the guard electrode, (ii) measure either the electrical current in the measuring electrode or the potential drop between the first and second potential electrodes, and (iii) compute at least one quantity at least partially related to the formation resistivity from the measured current or potential drop.

A suitable controller 300 may also be configured to construct LWD microresistivity images of the subterranean formation. In such imaging applications, the microresistivity measurements may be acquired and correlated with corresponding azimuth measurements (obtained, for example, from the directional sensors 140 deployed in the tool 100) while the tool rotates in the borehole. As such, the controller may therefore include instructions for temporally correlating LWD sensor measurements with sensor azimuth (toolface) measurements. The LWD sensor measurements may further be correlated with depth measurements. Borehole images may be constructed using substantially any known methodologies, for example, including conventional binning, windowing, or probability distribution algorithms. U.S. Pat. No. 5,473,158 discloses a conventional binning algorithm for constructing a borehole image. Commonly assigned U.S. Pat. No. 7,027,926 to Haugland discloses a technique for constructing a borehole image in which sensor data is convolved with a one-dimensional window function. Commonly assigned U.S. Pat. No. 7,558,675 to Sugiura discloses an image constructing technique in which sensor data is probabilistically distributed in either one or two dimensions.

A suitable controller may also optionally include other controllable components, such as other sensors, data storage devices, power supplies, timers, and the like. As described above, the controller is disposed to be in electronic communication with the various sensors deployed in the drilling system. The controller may also optionally be disposed to communicate with other instruments in the drill string, such as telemetry systems that further communicate with the surface or a steering tool. Such communication can significantly enhance directional control while drilling. A controller may further optionally include volatile or non-volatile memory or a data storage device for downhole storage of measured currents, measured voltage drops, microresistivity values, and/or LWD images. The invention is not limited in these regards.

Although the present invention and its advantages have been described in detail, it should be understood that various changes, substitutions and alternations can be made herein without departing from the spirit and scope of the invention as defined by the appended claims.

I claim:

1. A logging while drilling microresistivity tool comprising:
   a logging while drilling tool body;
   a guard electrode configured to inject electrical current into a formation;
   a measuring electrode deployed in and electrically isolated from the guard electrode;
   a return electrode spaced apart from the guard electrode, the return electrode providing a return path for the electrical current;
   a shield electrode interposed between the guard electrode and the return electrode;
   first and second potential electrodes deployed in the shield electrode; and
   a controller including a switch configured to switch the tool between first and second microresistivity measurement modes, the switch having first and second positions, the first position corresponding to the first measurement mode and the second position corresponding to the second measurement mode.

2. The logging while drilling tool of claim 1, wherein the shield electrode is (i) electrically connected to a current/voltage supply when the switch is in the first position and (ii) electrically connected to the tool body when the switch is in the second position.

3. The logging while drilling tool of claim 2, wherein the current/voltage supply is configured to electrically connect the shield electrode to (i) the guard electrode or (ii) the return electrode when the switch is in the first position.

4. The logging while drilling tool of claim 2, wherein the current/voltage supply is configured to independently control an electrical potential of the shield electrode in a range of potentials less than or equal to an electrical potential of the guard electrode and greater than or equal to an electrical potential of the return electrode when the switch is in the first position.

5. The logging while drilling tool of claim 1, wherein the controller is further configured to:
   measure an electrical current in the measuring electrode and relate said electrical current in the measuring electrode to a resistivity of the formation when the switch is in the first position; and
   measure a potential drop between the first and second potential electrodes and relate the potential drop to a resistivity of the formation when the switch is in the second position.

6. The logging while drilling tool of claim 1, wherein the controller is further configured to:
   apply a low frequency AC voltage between the guard electrode and the return electrode when the switch is in the first position; and
   apply a high frequency AC current between the guard electrode and the return electrode when the switch is in the second position.

7. The logging while drilling tool of claim 6, wherein:
   the AC voltage has a frequency in the range from about 0.1 to about 10 kHz; and
   the AC current has a frequency in the range from about 0.1 to about 10 MHz.

8. The logging while drilling tool of claim 1, wherein the guard electrode, the return electrode, the measuring electrode, the shield electrode, and the first and second potential electrodes comprise a microresistivity sensor which is deployed on the tool body.

9. The logging while drilling tool of claim 1, wherein:
   the guard electrode and the return electrode are longitudinally spaced apart from one another;
   the shield electrode is deployed longitudinally between the guard electrode and the return electrode; and the first and second potential electrodes are longitudinally spaced apart from one another.

10. The logging while drilling tool of claim 1, further comprising first, second, and third shield electrodes interposed between the guard electrode and the return electrode.

11. The logging while drilling tool of claim 1, further comprising an azimuth sensor configured to measure an azimuth angle of the measuring electrode.

12. The logging while drilling tool of claim 1, further comprising a conductivity sensor configured to measure a conductivity of a drilling fluid.

13. The logging while drilling tool of claim 12, wherein the controller is further configured to automatically set the switch to: (i) the first position when a measured conductivity is greater than a predetermined conductivity and (ii) the second position when the measured conductivity is less than the predetermined conductivity.

14. A method for microresistivity logging while drilling in a subterranean borehole, the method comprising:
(a) providing a microresistivity logging while drilling tool, the tool including (i) a logging while drilling tool body, (ii) a guard electrode configured to inject electrical current into a formation, (iii) a measuring electrode deployed in and electrically isolated from the guard electrode, (iv) a return electrode spaced apart from the guard electrode, the return electrode providing a return path for the electrical current, (v) a shield electrode interposed between the guard electrode and the return electrode, (vi) first and second potential electrodes deployed in the shield electrode, and (vii) a controller including a switch configured to switch the tool between first and second microresistivity measurement modes, the switch having first and second positions, the first position corresponding to the first measurement mode and the second position corresponding to the second measurement mode;
(b) causing the switch to be in the first position;
(c) deploying the tool in a subterranean borehole, the borehole being at least partially filled with an electrically conductive drilling fluid;
(d) causing an AC voltage to be applied between the guard and return electrodes;
(e) causing an alternating current to be measured in the measuring electrode; and
(f) computing a quantity at least partially related to the formation resistivity from the current measured in (e).

15. The method of claim 14, wherein the measuring electrode is held at substantially the same AC voltages as the guard electrode in (d).

16. The method of claim 14, wherein the AC voltage applied in (d) has a frequency in the range from about 0.1 to about 10 kHz.

17. The method of claim 14, wherein the microresistivity logging tool provided in (a) further comprises an azimuth sensor and (e) further comprises causing the azimuth sensor to measure an azimuth angle, the method further comprising:
(g) correlating the quantity computed in (f) with the azimuth angle measured in (e).

18. A method for microresistivity logging while drilling in a subterranean borehole, the method comprising:
(a) providing a microresistivity logging while drilling tool, the tool including (i) a logging while drilling tool body, (ii) a guard electrode configured to inject electrical current into a formation, (iii) a measuring electrode deployed in and electrically isolated from the guard electrode, (iv) a return electrode spaced apart from the guard electrode, the return electrode providing a return path for the electrical current, (v) a shield electrode interposed between the guard electrode and the return electrode, (vi) first and second potential electrodes deployed in the shield electrode, and (vii) a controller including a switch configured to switch the tool between first and second microresistivity measurement modes, the switch having first and second positions, the first position corresponding to the first measurement mode and the second position corresponding to the second measurement mode;
(b) causing the switch to be in the second position;
(c) deploying the tool in a subterranean borehole, the borehole being at least partially filled with an electrically non-conductive drilling fluid;
(d) causing an alternating current to applied between the guard and return electrodes;
(e) causing an AC potential difference to be measured between the first and second potential electrodes; and
(f) computing a quantity at least partially related to the formation resistivity from the potential difference measured in (e).

19. The method of claim 18, wherein the alternating current applied in (d) has a frequency in the range from about 0.1 to about 10 MHz.

20. The method of claim 18, wherein the microresistivity logging tool provided in (a) further comprises an azimuth sensor and (e) further comprises causing the azimuth sensor to measure an azimuth angle, the method further comprising:
(g) correlating the quantity computed in (f) with the azimuth angle measured in (e).

21. A method for microresistivity logging while drilling in a subterranean borehole, the method comprising:
(a) deploying a microresistivity logging while drilling tool in a subterranean borehole, the tool including (i) a logging while drilling tool body, (ii) a guard electrode configured to inject electrical current into a formation, (iii) a measuring electrode deployed in and electrically isolated from the guard electrode, (iv) a return electrode spaced apart from the guard electrode, the return electrode providing a return path for the electrical current, (v) a shield electrode interposed between the guard electrode and the return electrode, (vi) first and second potential electrodes deployed in the shield electrode, and (vii) a controller including a switch configured to switch the tool between first and second microresistivity measurement modes, the switch having first and second positions, the first position corresponding to the first measurement mode and the second position corresponding to the second measurement mode;
(b) causing the switch to be in the first position;
(c) causing an AC voltage to be applied between the guard and return electrodes;
(d) causing an alternating current to be measured in the measuring electrode;
(e) causing the switch to be in the second position;
(f) causing an alternating current to be applied between the guard and return electrodes;
(g) causing an AC potential difference to be measured between the first and second potential electrodes; and
(h) computing first and second quantities at least partially related to the formation resistivity from the alternating current measured in (d) and the the potential drop measured in (g).

22. The method of claim 21, wherein the AC voltage applied (c) has a frequency in the range from about 0.1 to about 10 kHz and the alternating current applied in (f) has a frequency in the range from about 0.1 to about 10 MHz.

* * * * *